United States Patent [19]

Ishida et al.

[11] Patent Number: 4,868,596
[45] Date of Patent: Sep. 19, 1989

[54] MOTOR DRIVEN SHUTTER FOR CAMERA

[75] Inventors: Hiroaki Ishida; Nobuo Shinozaki, both of Yotsukaido, Japan

[73] Assignee: Seikosha Co., Ltd., Japan

[21] Appl. No.: 234,808

[22] Filed: Aug. 22, 1988

[30] Foreign Application Priority Data

Aug. 31, 1987 [JP] Japan .......................... 62-133112[U]

[51] Int. Cl.$^4$ .............................. G03B 7/08
[52] U.S. Cl. .................... 354/439; 354/400; 354/234.1
[58] Field of Search ............... 354/400, 234.1, 435, 354/439, 195.1

[56] References Cited

U.S. PATENT DOCUMENTS 4,768,051 8/1988 Sasaki ............................ 354/234.1

Primary Examiner—L. T. Hix
Assistant Examiner—David M. Gray
Attorney, Agent, or Firm—Bruce L. Adams; Van C. Wilks

[57] ABSTRACT

A motor driven shutter for a camera provided with a drive member moving in a lens operating area and an exposure operating area that are parted in one and the other, only one motor capable of reciprocal operation for operating said drive member, a range member for setting a lens position by interlocking with said drive member in said lens operating area, an urging member for urging said range member in a direction toward an initial position, an opening and closing member which has a sector open and close by interlocking with said drive member on said exposure operating area, locking means which locks said range member at a position corresponding to a focusing direction signal, and releasing means for releasing the locking of said range member by moving said drive member to the lens operating area again after exposure operation is completed.

1 Claim, 6 Drawing Sheets

MOTOR DRIVEN SHUTTER FOR CAMERA

DETAILED DESCRIPTION OF THE DEVICE

1. Industrial Field

The present device relates to a motor driven shutter for an automatic focusing and automatic exposure camera.

2. Prior Art

Generally, as described in the Patent Gazette No. 26450/87, in a motor driven shutter which performs lens operation for the purpose of focusing and exposure operation in succession with a single motor, a camera lens locked at a position corresponding to a focusing signal is composed so as to be reset in an instant by means of the urging force of a spring after exposure operation. Furthermore, in general, the camera lens is provided with adjusting means for focusing accurately on a film surface and fine adjustment is executed in a manufacturing process.

Problems to Be Solved by the Device

Accordingly, abovementioned shutter involves various problems such as riskiness that focusing of the camera lens gets out of order by the shock, shutter operating noise and less durability of camera lens related components because the camera lens is reset in an instant by means of the urging force of the spring.

Thereupon, it is an object of the present application to reduce the shock when the camera lens is reset for the purpose of solving abovementioned problems by controlling the reset speed of the camera lens to the initial position with a motor.

Means to Solve the Problems

In order to achieve abovementioned objects, according to the present application in a motor driven shutter for a camera provided with a drive member moving in a lens operating area and an exposure operating area that are parted in one and the other, a motor for operating said drive member, a range member for setting a lens position by interlocking with said drive member in said lens operating area, an urging member for urging said range member in a direction toward an initial position, holding means which locks said range member at a position corresponding to a forcusing detection signal, and releasing means for releasing the locking by moving said drive member to the lens operating area again after exposure operation is completed, said releasing means are composed so that said locking is released in the neighbourhood of the maximum movement of said range member, this state is maintained, and thereafter, said maintenance is released in the neighbourhood of the initial position of said range member, and said range member is reset so as to follow said drive member.

1 . . . drive ring
2 . . . range ring
5 . . . sector lever
6 . . . focusing lock lever
7 . . . releasing lever
M . . . step motor.

Details of the present application will be described hereafter based on an embodiment shown in the accompanying drawings.

Embodiment

Figure 1:
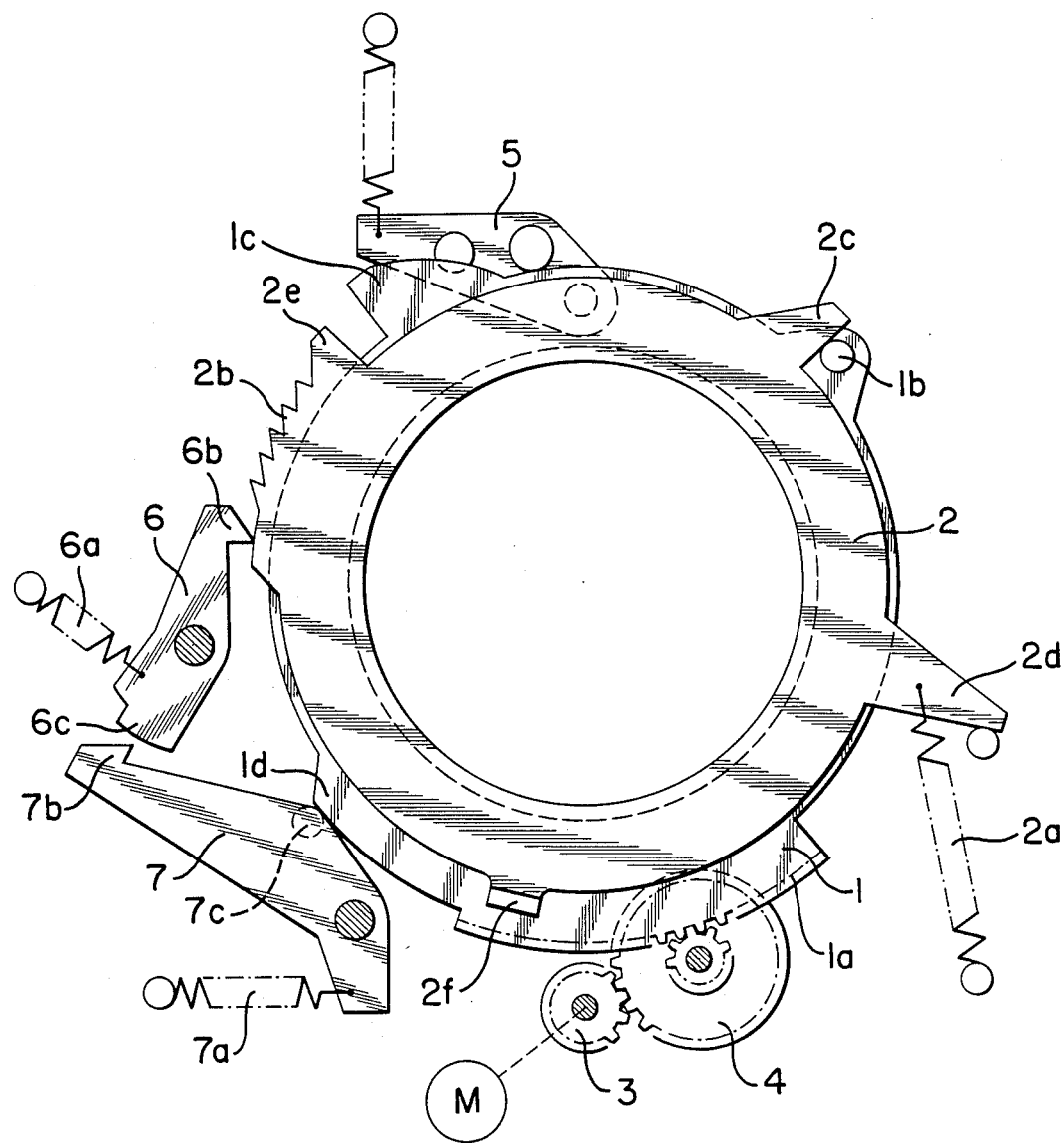
FIG. 1 is a block diagram showing an embodiment according to the present application.

In FIG. 1 thru FIG. 4 showing an embodiment of the present application, FIG. 1 is a block diagram showing a state before shutter release. In the Figures, a reference numeral 1 denotes a drive ring which is supported rotatably on a fixed substrate not shown with an optical axis of a camera lens as a center, and is capable of rotating bidirectionally with counterclockwise rotation for a lens operating area and clockwise rotation for an exposure operating area. This drive ring is provided with a rack portion 1a coupled with the rotation of a step motor M by toothed gears through a pinion 3 and an idler 4, a pin 1b for interlocking a range ring 2 which is described later, a cam portion 1c for opening a sector not shown through a sector lever 5 at the time of clockwise rotation, viz., at the time of exposure operation, and a cam portion 1d for releasing the locking of a focusing lock lever 6 and a releasing lever 7 which will be described later.

A reference numeral 2 denotes a range ring fitted rotatably on the fixed substrate under such a state that it is always urged clockwise by means of a spring 2a with the optical axis as the center in the similar manner as said drive ring 1. The range ring 2 is provided with a portion 2b of a plurality of teeth, a projected portion 2c which abuts against a pin 1b on said drive ring, a projected portion 2d which abuts against the pin on the fixed substrate so as to control the initial position, a cam portion 2e which releases the locking of a focusing lock lever 6 which is described later and said locking teeth portion 2b, and a lens coupling portion 2f for moving a camera lens not shown to a focusing position.

A reference numeral 6 denotes a focusing lock lever urged clockwise by a spring 6a and fitted rotatably on the fixed substrate. This lever is provided with a claw portion 6b locking the locking teeth portion 2b of said range ring at one end thereof and a locking portion 6c locked by a releasing lever 7 which is described later at the other end thereof.

A reference numeral 7 denotes a releasing lever urged clockwise by a spring 7a and fitted rotatably on the fixed substrate. This lever is provided with a claw portion 7b locking the locking portion 6c of said focusing lock lever and a pin 7c engaged with a cam portion 1d of said range ring, and is composed in such a relationship that said claw portion 7b and locking portion 6c are not engaged with each other when said cam portion 1d and the pin 7c are engaged with each other.

Figure 4A:
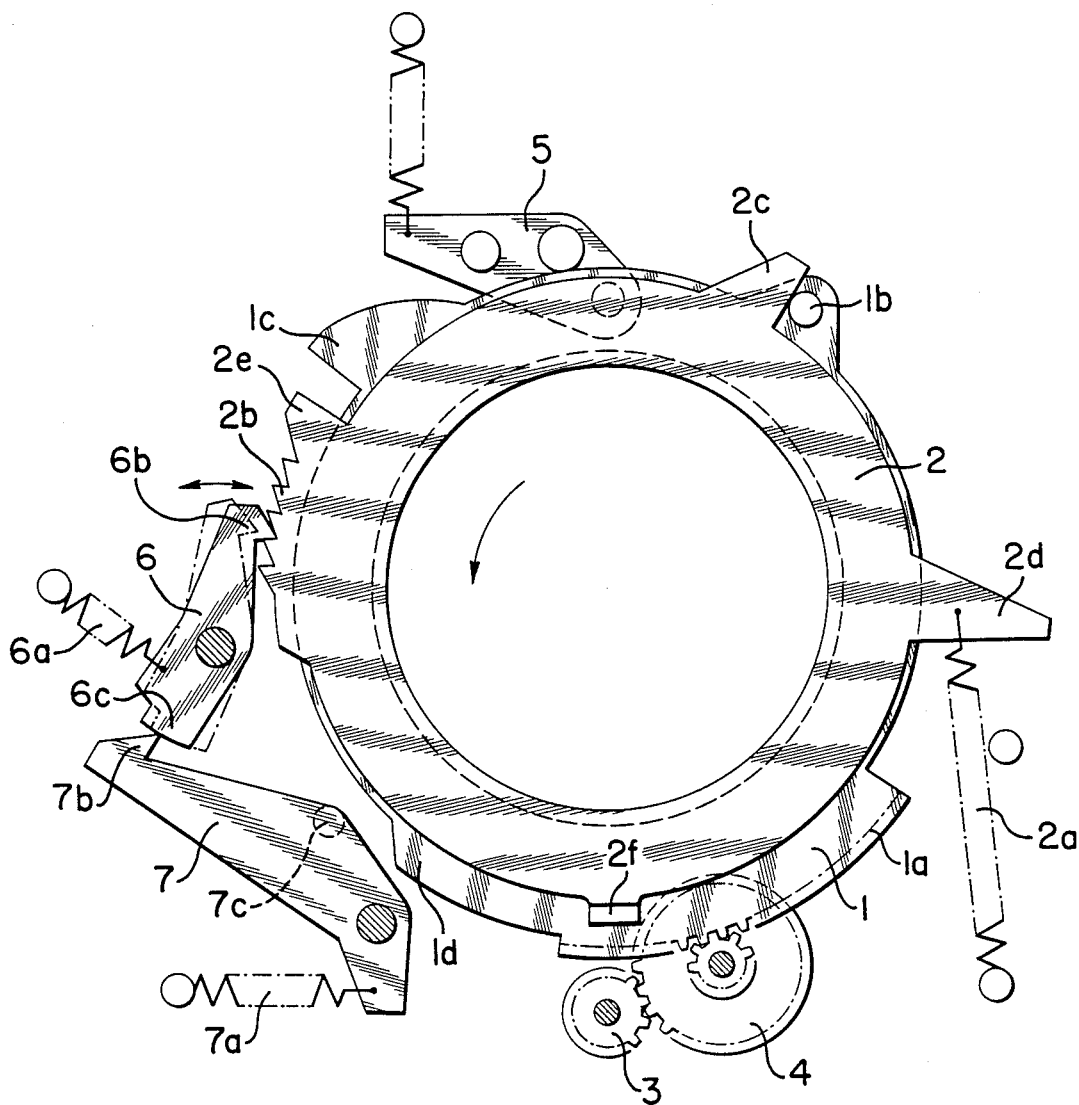
FIGS. 4 (a) thru (c) are operation diagrams showing midway of operation of the embodiment of the present application.
Figure 4B:
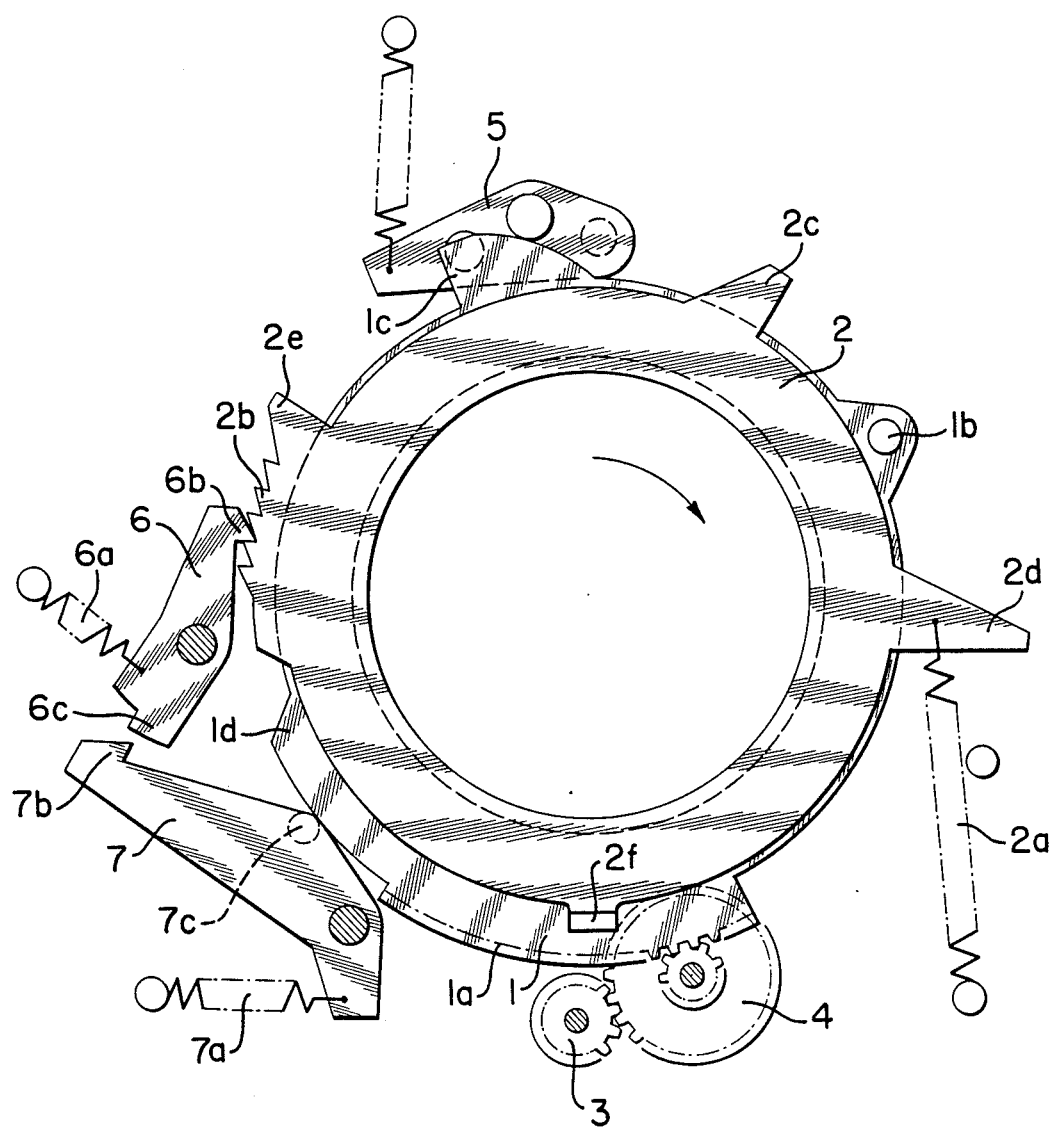
Figure 4C:
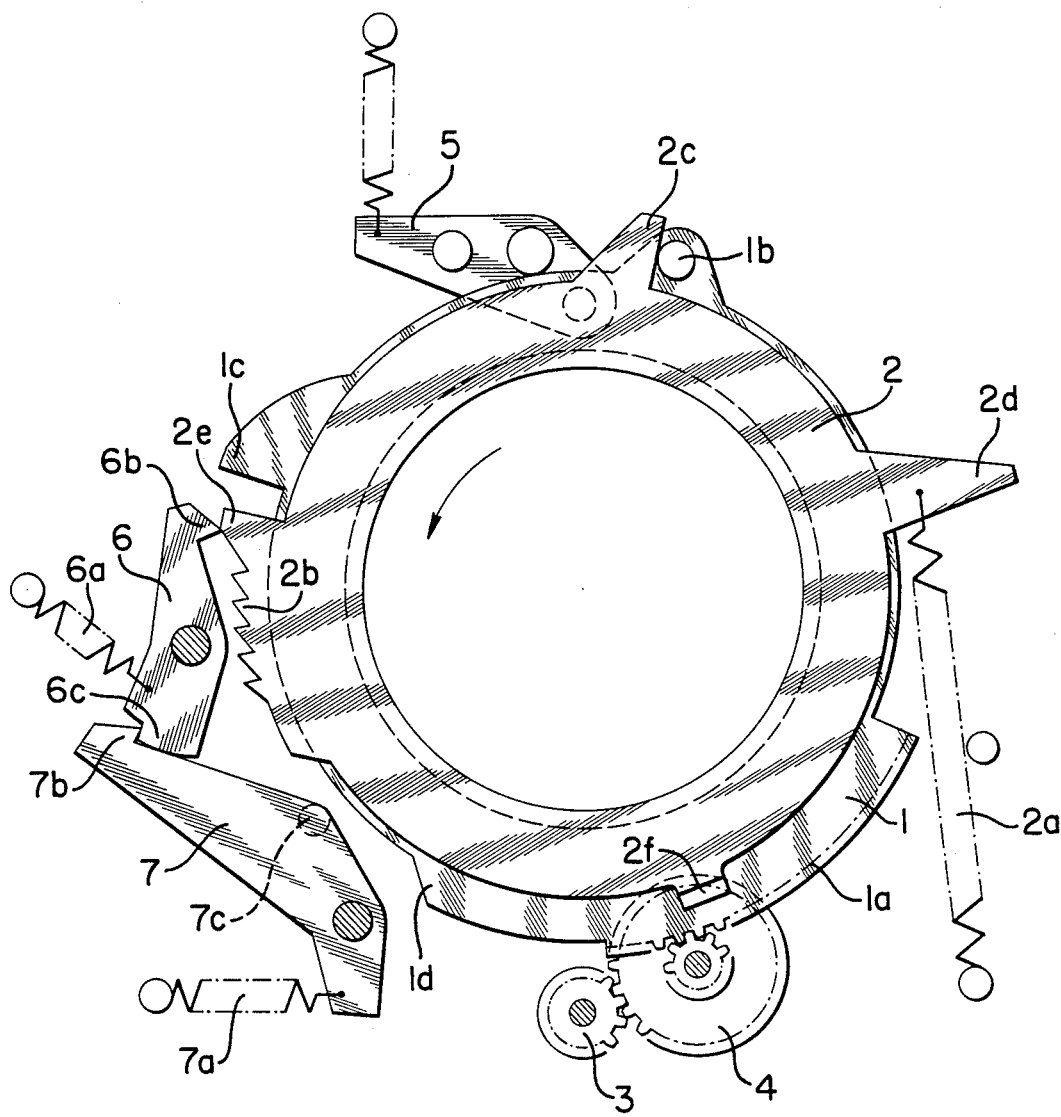

Besides, the relationship among the cam portion 2e of said range ring, the claw portion 6b and the locking portion 6c of said focusing lock lever, and the claw portion 7b of said releasing lever is formed in such a manner that the claw portion 6b is at a position where it does not interfere outside of the rotary locus of the locking teeth portion 2b under engaged state of the cam portion 2e and the claw portion 6b in the neighbourhood of the maximum movement of said range ring as shown in FIG. 4 (c), and moreover, the claw portion 7b and the locking portion 6c are locked with each other and the operation of the focusing lock lever 6 is controlled.

Figure 2:
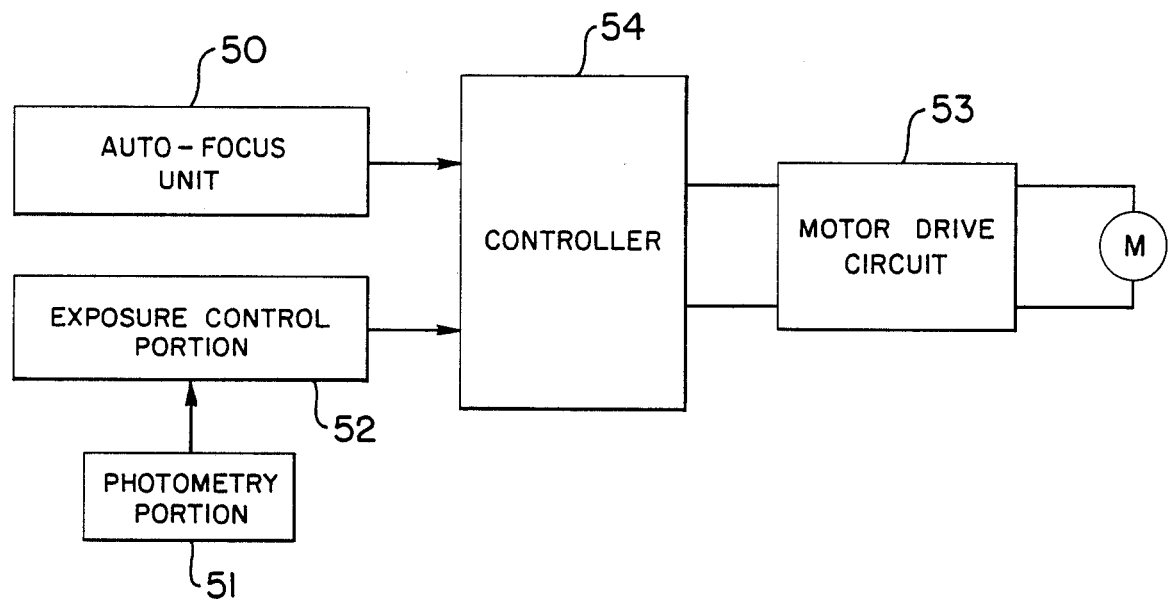
FIG. 2 is a block diagram showing an example of a control circuit used in the present application.
Figure 3:
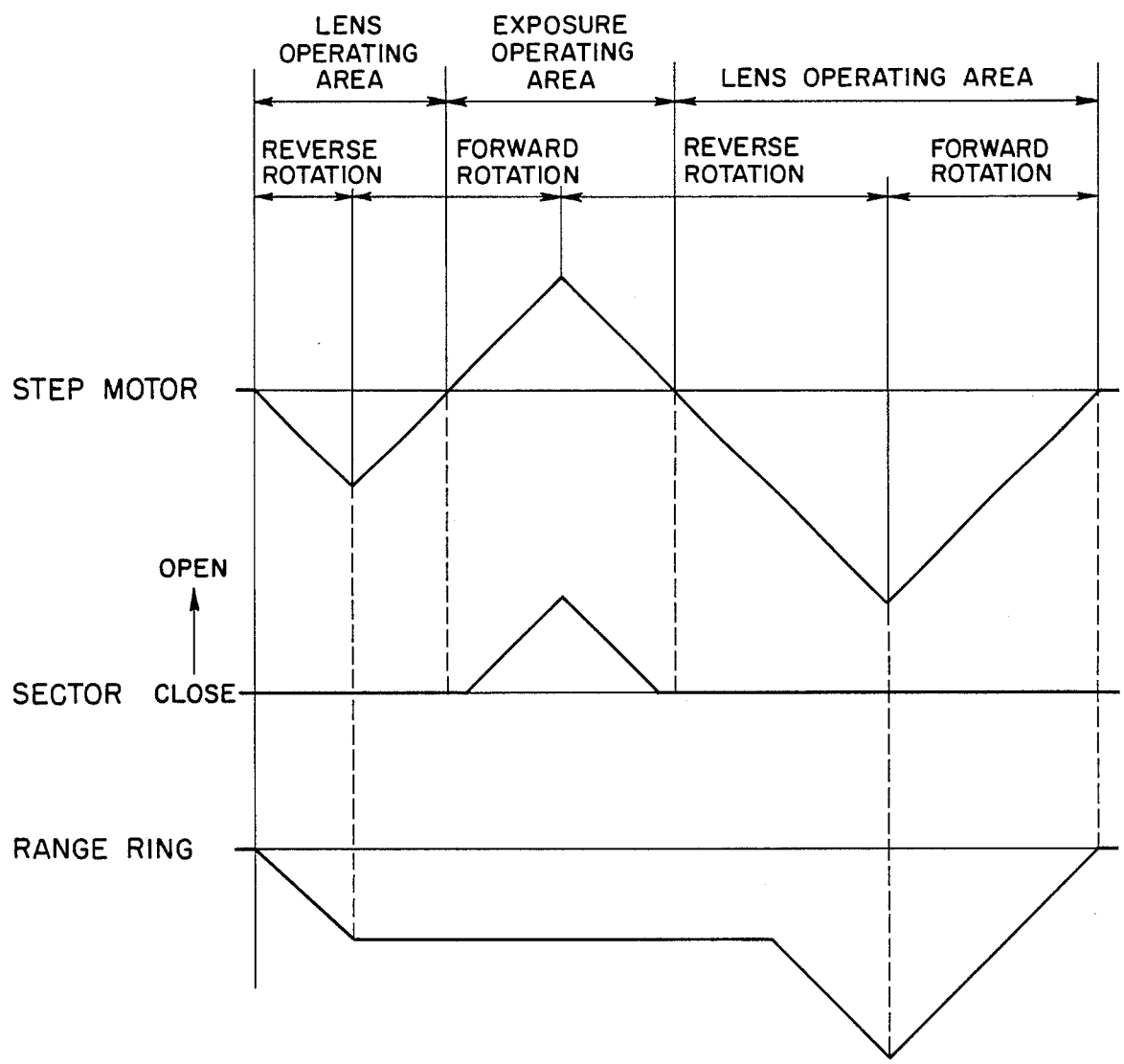
FIG. 3 is a time chart showing the operation of the embodiment of the present application.

FIG. 2 is a block diagram of a control circuit, which consists of an auto-focus unit 50 which performs focus detection and outputs a focus signal, an exposure control portion 52 which determines exposure by means of brightness information obtained from a photometry portion 51 which performs photometry of the brightness of the object, film sensitivity information and so forth and outputs an exposure signal, and a controller 54 which controls forward rotation and reverse rotation of the step motor M through a motor drive circuit 53 for performing predetermined lens position setting and exposure by the focusing signal of said auto-focus unit 50 and the exposure signal of said exposure control portion 52.

Next, the operation of abovementioned embodiment will be described.

The control circuit is operated by operating a releasing member not shown from the state before releasing shown in FIG. 1, a focusing signal from the auto-focus unit 50 and an exposure signal from the exposure control portion 52 are input to a controller 54, the number of pulses of forward and reverse rotation of the step motor M are determined such that numbers in lens operating area are determined from the focusing signal and numbers in exposure operating area are determined from the exposure signal, and the step motor M commences the operation thereof.

First, when the step motor M is rotated reversely counterclockwise in order to set the camera lens at a position corresponding to the focusing signal, the drive ring 1 is rotated counterclockwise through the pinion 3 and the idler 4, the pin 1b of the drive ring and the projected portion 2c of the range ring abut against each other, and the range ring 2 also rotates counterclockwise. By means of such counterclockwise rotation, the focusing lock lever 6 engages with the locking teeth portion 2b of the range ring as shown in FIG. 4 (a) and oscillates along the shape of the locking teeth portion 2b, the engagement between the pin 7c of the releasing lever and the cam portion 1d of the drive ring is released, and the releasing lever 7 is rotated clockwise but is controlled on the side of the locking portion 6c of the focusing lock lever. Besides, abovementioned oscillation is not controlled in the oscillation of said focus in lock lever 6, because the locking portion 6c and the claw portion 7b of the releasing lever have a positional relationship which are not locked with each other. Then, after the drive ring 1 and the range ring 2 rotate reversely in the number of pulses corresponding to the focusing signal by means of the step motor M, the step motor M is inverted to perform forward rotation clockwise and the drive ring 1 commences clockwise rotation. At this time, the range ring 2 is also going to interlock with the drive ring 1, but the range ring 2 stops its operation since the locking teeth portion 2b is locked by the claw portion 6b of the focusing lock lever. Thus, the focusing position of the camera lens not shown which interlocks with this range ring is determined. Furthermore, the step motor M performs forward rotation in the number of pulses corresponding to the focusing signal thereby to rotate the drive ring 1 clockwise so as to reset it to the initial position, and continues to rotate the drive ring 1 in the exposure operating area. The number of pulses in forward and reverse rotation of the step motor M in the exposure operating area is determined in advance by the signal of the exposure control portion 52. By means of clockwise rotation of the drive ring 1 corresponding to this number of pulses, the cam portion 1c of said ring and the sector lever 5 are related with each other as shown in FIG. 4 (b), and a sector not shown performs opening operation because the sector lever 5 is rotated counterclockwise against the spring. Then, after forward rotation in a predetermined number of pulses is performed, the step motor M is inverted to rotate reversely counterclockwise. Therefore, the sector lever 5 is rotated clockwise along the cam portion 1c thereby to close the sector, and thus the drive ring 1 is reset to the initial position thereof.

Thereafter, the step motor M further continues the reverse rotation in a predetermined number of pulses upto the state that the focusing lock lever 6 and the cam portion 2e of the range ring are related to get in touch with each other. During this operation, the projected portion 2c of the range ring which is at a standstill for focusing of the camera lens and the pin 1c of the drive ring abut against each other. Therefore, the drive ring 1 and the range ring 2 rotate counterclockwise until the state shown in FIG. 4 (c), and the claw portion 6b of the focusing lock lever is raised until it gets out of the rotary locus of the locking teeth portion 2b of the range ring by the cam portion 2e of the range ring. The locking portion 6c of the focusing lock lever is locked by the claw portion 7b of the releasing lever, thus the focusing lock lever 6 is maintained. Keeping such maintained state, the step motor M is inverted so as to be reset to the initial position and performs forward rotation in a predetermined number of pulses. Therefore, the drive ring 1 rotates clockwise, and the range ring 2 follows this drive ring 1 by the urging force of the spring 2a. Then, immediately before the drive ring 1 rotates clockwise and gets to the initial positional state shown in FIG. 1, the cam portion 1d of the drive ring and the pin 7c of the releasing lever are engaged and the releasing lever 7 is rotated counterclockwise. Therefore, the locking of the focusing lock lever 6 is released and the focusing lock lever 6 is rotated clockwise, thus being reset to the state shown in FIG. 1 to complete the operation.

Effects of the Invention

As described above, according to the present application, a relationship to release the range member from locking in the neighbourhood of the maximum movement of the range member is maintained after exposure operation, and such a state is released in the neighbourhood of the initial position of the range member. And, the range member released from locking after exposure operation is reset under the state following the drive member driven by the motor from the neighbourhood of the maximum movement to the initial position. Accordingly, the range member and the camera lens operated by the range member are reset interlocking with the motor speed. Therefore, the shock which is abovementioned defect of a conventional case is improved by a large margin. Since the composition is also simple, this invention is suitable for a lowcost shutter for automatic focusing and automatic exposure camera.

What is claimed is:

1. A motor driven shutter for a camera provided with a drive member moving in a lens operating area and an exposure operating area that are parted in one and the other, only one motor capable of reciprocal operation for operating said drive member, a range member for setting a lens position by interlocking with said drive member in said lens operating area, an urging member for urging said range member in a direction toward an initial position, an opening and closing member which has a sector open and close by interlocking with said drive member on said exposure operating area, locking means which locks said range member at a position corresponding to a focusing detection signal, and releasing means for releasing the locking of said range member by moving said drive member to the lens operating area again after exposure operation is completed, characterized in that:

said releasing means consist of a first releasing portion which operates in the neighborhood of the maximum movement of said range member and releases the locking of said locking means; a maintaining portion which maintains the releasement released by said first releasing portion; and a second releasing portion which gets in touch with said drive member in the vicinity of the initial position of said range member and releases the maintaining function of said maintaining portion and said range member is reset so as to follow said drive member.

* * * * *